US012344384B2

(12) United States Patent
Schwager

(10) Patent No.: US 12,344,384 B2
(45) Date of Patent: Jul. 1, 2025

(54) LANDING AID FOR A PARACHUTIST

(71) Applicant: Lindnerhof-Taktik GmbH, Lenggries (DE)

(72) Inventor: Martin Schwager, Penzberg (DE)

(73) Assignee: LINDNERHOF-TAKTIK GMBH, Lenggries (DE)

( * ) Notice: Subject to any disclaimer, the term of this patent is extended or adjusted under 35 U.S.C. 154(b) by 0 days.

(21) Appl. No.: 18/408,081

(22) Filed: Jan. 9, 2024

(65) Prior Publication Data

US 2024/0239497 A1 Jul. 18, 2024

(30) Foreign Application Priority Data

Jan. 12, 2023 (DE) .................... 20 2023 100 143.2

(51) Int. Cl.
*B64D 17/78* (2006.01)
*B64D 25/04* (2006.01)

(52) U.S. Cl.
CPC ............. *B64D 17/78* (2013.01); *B64D 25/04* (2013.01)

(58) Field of Classification Search
CPC .... B64D 17/78; B64D 25/04; B64D 2201/00; B64C 31/0285
See application file for complete search history.

(56) References Cited

U.S. PATENT DOCUMENTS 9,522,737 B2 * 12/2016 Fradet ................... B64D 17/30

FOREIGN PATENT DOCUMENTS

| AT | 410432 B | 4/2003 | |
|---|---|---|---|
| DE | 9017104 U1 | 3/1991 | |
| DE | 4039516 A1 | 6/1991 | |
| DE | 19815353 A1 | 10/1999 | |
| DE | 19835896 A1 | 2/2000 | |
| DE | 60010495 T5 | 5/2005 | |
| DE | 202016001193 U1 | 5/2017 | |
| EP | 605360 A1 * | 7/1994 | .......... B64D 17/025 |
| EP | 0903289 A1 | 3/1999 | |
| EP | 2221090 A1 | 8/2010 | |
| EP | 2360067 B1 | 6/2014 | |
| EP | 2815791 A1 | 12/2014 | |
| FR | 1138001 A | 6/1957 | |
| KR | 20110107048 A | 9/2011 | |
| WO | 0020277 A1 | 4/2000 | |

* cited by examiner

*Primary Examiner* — Justin M Benedik
(74) *Attorney, Agent, or Firm* — McCoy Russell LLP

(57) ABSTRACT

The present disclosure discloses a landing aid for a parachutist, in particular for a tandem jump or landing with heavy equipment, having an air bag, which protects the parachutist during landing, wherein the air bag has an inflow opening through which air can flow into the air bag in order to fill it by means of the airstream. It is provided that the landing aid comprises a spring element, by means of which the inflow opening is held in the correct position with respect to the air flow and/or an unpacking process of the air bag is supported.

21 Claims, 6 Drawing Sheets

LANDING AID FOR A PARACHUTIST

CROSS REFERENCE TO RELATED APPLICATION

The present application claims priority to German Patent Application No. 20 2023 100 143.2 filed on Jan. 12, 2023. The entire contents of the above-listed application are hereby incorporated by reference for all purposes.

TECHNICAL FIELD

The present disclosure relates to a landing aid for a parachutist, in particular for a tandem jump or landing with heavy equipment.

BACKGROUND

When parachuting, the landing often takes place in a sitting position, in particular in the case of a tandem jump or with heavy equipment. Depending on the ground, this may be very uncomfortable for the parachutist, i.e. the person using the parachute, or lead to injuries in the buttocks or lower back area.

SUMMARY

From document EP 605360 B1, an air bag that can be inflated by the airstream is known for the field of paragliding as a safety device for users of paragliding equipment. This air bag is attached to the bottom and back of the seat on which the paraglider pilot sits during flight and landing. Before landing, a pack device is removed via a release handle and the air bag is filled by the airstream. For this purpose, an inflow opening is provided on the front side of the air bag, which is to be placed in the correct position by its weight, wherein the inflow opening is equipped with a hose valve.

The object of the present disclosure is to provide an improved landing aid. This object is achieved in several independent aspects of the present disclosure.

According to a first aspect, the present disclosure comprises a landing aid for a parachutist, in particular for a tandem jump or landing with heavy equipment. The landing aid comprises an air bag, which protects the parachutist during landing, wherein the air bag has an inflow opening through which air can flow into the air bag in order to fill it by means of the airstream. According to the first aspect, the landing aid comprises a spring element, by means of which the inflow opening is held in the correct position with respect to the air flow and/or an unpacking process is supported.

The spring element provided according to the disclosure increases safety when using the landing aid. According to the first variant, the spring element keeps the air inflow opening in the correct position with respect to the air flow. Unlike in the prior art, the weight of the inflow opening alone is no longer used to position it. The landing aid can thus be implemented more easily. Furthermore, the safety of the positioning of the inflow opening is increased and it is prevented from being forced out of the air flow if the airstream is too strong. According to the second variant, the spring element supports an unpacking process of the air bag. This also increases safety when using the landing aid, as the unfolding of the air bag is supported by the spring element and errors when unpacking or unfolding the air bag are avoided.

Preferably, both variants of the first aspect are realized in combination. In one possible embodiment, different spring elements can be used for the first and second variants, i.e. different spring elements for positioning the inflow opening and supporting the unpacking process. Preferably, however, a spring element is used that has the function according to the first and the second variant, i.e. keeps the inflow opening in the correct position with respect to the air flow and supports an unpacking process of the air bag.

According to a possible embodiment of the present disclosure, the spring element is integrated in the air bag. For example, the spring element can be sewn into the air bag.

According to a possible embodiment of the present disclosure, the spring element comprises one or more first support regions with which it is supported on a region of the air bag held in shape by the dynamic pressure inside the air bag. The spring element is therefore not supported in a region that is directly connected to the parachutist, but with the air bag in a region that is kept in shape by the dynamic pressure inside the air bag. This allows the spring element to be optimally positioned.

In particular, the first support region of the spring element is attached to a region of the air bag that consists of textile elements. For example, the first support region is attached in the region of a seam between two textile elements of the air bag, and in particular sewn to the air bag there. Arranging the first support regions at a corresponding region of the air bag supports the unpacking and unfolding process of the air bag.

According to a possible embodiment of the present disclosure, the spring element comprises one or more second support regions with which it applies a counterforce to the inflow opening acting against the pressure of the airstream. This keeps the inflow opening in the correct position with respect to the air flow according to the first aspect.

According to a possible embodiment of the present disclosure, the spring element is a torsion spring element.

According to a possible embodiment of the present disclosure, the spring element is made of plastic. In particular, the spring element can comprise one or more torsion springs cut out of a plastic plate. For example, the torsion springs can be Z-shaped and cut out of a plastic plate. This makes it relatively easy to provide torsion springs. Preferably, the plastic spring elements can be sewn into the air bag.

According to a possible embodiment of the present disclosure, the spring element at least two springs working in parallel. This increases safety through a redundant arrangement.

According to a possible embodiment of the present disclosure, the spring element comprises two torsion springs, the torsion axis of which extends along one upper edge of the inflow opening in each case, wherein the torsion springs each have a first arm, which extends along one of the two side edges of the inflow opening. This applies a counterforce to the inflow opening on both sides of the inflow opening. Preferably, the first arms of the torsion springs extend to the lower edge of the inflow opening and further preferably extend partially along the lower edge. Together, the torsion springs therefore preferably surround the inflow openings over at least 80% of their circumference.

According to a possible embodiment, the torsion springs each comprise a second arm, which is supported above the inflow opening on a region of the air bag. In particular, the second arm is preferably supported on a region of the air bag that is only kept in shape by the dynamic pressure inside the air bag.

According to a second aspect, the present disclosure comprises a landing aid for a parachutist, in particular for a tandem jump or landing with heavy equipment. The landing aid comprises an air bag, which protects the parachutist during landing. The air bag has an inflow opening with a non-return valve through which air can flow into the air bag in order to fill it by means of the airstream. According to the second aspect, it is provided that the non-return valve has a flap valve element arranged inside the air bag, which is hinged to the air bag on one side and closes the inflow opening in the form of a flap when there is a corresponding pressure in the air bag.

Unlike in the prior art, a flap valve is used instead of a hose valve, which closes the inflow opening at the appropriate pressure inside the air bag. Such a flap valve has proven to be more reliable than the hose valve used in the prior art.

In particular, the flap valve closes the inflow opening of the air bag during landing, so that the air cannot escape from the air bag via the inflow opening and the air bag can therefore fulfil its damping function during landing.

According to a possible embodiment of the present disclosure, the flap valve element is formed by a textile element. The hinge-like fastening also preferably results from the flexibility of a textile material of which the flap valve element is made and/or by means of which the flap valve element is fastened, in particular sewn, to the air bag.

According to a possible embodiment, the textile element is reinforced with a support element in a region surrounding the inflow opening. In particular, the support element can be made of plastic and/or be sewn into the textile element. In particular, the support element surrounds the inflow opening around its entire circumference and/or is supported from the inside on a region of the air bag surrounding the inflow opening.

Preferably, the flap valve element is hinged to the air bag at its upper edge, in particular sewn to it. As already described, the hinge-like movement of the flap valve element preferably results from the flexibility of its material.

According to a possible embodiment, a band element extends across the inflow opening, which prevents the flap valve element from being pressed out through the inflow opening. The band element preferably runs in the vertical direction across the inflow opening. In particular during landing, a large internal pressure acts on the flap valve element. The band element prevents the flap valve element from being pressed outward through the inflow opening by the large forces acting on it.

According to a possible embodiment, the free end of the flap valve element is secured by a strap element, which prevents complete opening of the flap valve element. In particular, the band element runs from a lower edge of the inflow opening to the upper edge of the flap valve element.

According to a third aspect, the present disclosure comprises a landing aid for a parachutist, in particular for a tandem jump or landing with heavy equipment. The landing aid comprises an air bag, which protects the parachutist during landing. The air bag has an inflow opening through which air can flow into the air bag in order to fill it by means of the airstream. According to the third aspect, the landing aid comprises leg loops with which it can be attached to the legs of the parachutist in such a way that the air bag extends backwards between the legs of the parachutist after opening.

Unlike in the prior art, the landing aid is no longer arranged on a seat, but between the legs of the parachutist. This avoids the bulky seat construction and allows the landing aid to be constructed lighter. The landing aid is therefore also suitable for a tandem jump. For this purpose, the air bag only has to be long enough to reach backwards between the legs of both parachutists after opening. The leg loops also securely fix the landing aid in position on the parachutist.

According to a possible embodiment, the leg loops are attached to the air bag. The leg loops hold the air bag in position when it put on. Slipping under the parachutist (the main jumper or the passenger) is therefore prevented.

According to a preferred embodiment, the leg loops are attached on a region of the air bag that is only kept in shape by the dynamic pressure inside the air bag, and in particular sewn to one or more textile regions of the air bag. This keeps this region of the air bag in position.

According to a possible embodiment, the right and left leg loops are connected via a strap. This avoids stressing the material of the air bag, as the connection via a strap absorbs forces from the leg loops when the parachutist pulls outwards with their legs on the leg loops. In particular, the strap elements of the right and left leg loops and their connection are formed by a continuous strap.

The strap connecting the leg loops preferably runs concealed inside the air bag. Preferably, the trap is firmly connected to the air bag in the outlet region.

The first, second and third aspects of the present disclosure are initially independently advantageous and are claimed independently. Preferably, however, two or all three of these aspects are combined, and are therefore present in combination in a single landing aid. In particular, an embodiment according to the first aspect may be combined with an embodiment according to the second aspect or according to the third aspect. Furthermore, the embodiment according to the second aspect may be combined with the third aspect. Likewise, all three aspects can be combined.

Further preferred embodiments are described below, which can be used in any of the aspects according to the disclosure and any combinations of these aspects.

According to a possible embodiment of the present disclosure, the landing aid comprises pannier firmly attached to the air bag, in which the air bag can be stowed, wherein the pannier comprises a release element for opening the pannier in flight and activating the air bag during flight.

The air bag is therefore always stowed in the pannier during freefall and initially during flight and is activated via the release element before landing.

According to a possible embodiment, strap elements are arranged on the pannier for connection to leg loops and/or a harness of the paraglider. In particular, the attachment of the landing aid to the parachutist can therefore be carried out at least partially via the pannier. To put on the landing aid, the pannier is therefore connected to the parachutist. By releasing the air bag, which is firmly connected to the pannier, the air bag is also connected to the parachutist.

The connection of the landing aid or the pannier to the parachutist can be made in particular by connecting the landing aid or the pannier to the parachutist's harness. For this purpose, corresponding strap elements and/or buckles can be provided on the landing aid or on the pannier. The attachment can, for example, be made to existing loops and/or eyelets of the harness in the hip area. Alternatively or additionally, the connection to the parachutist can also be made via leg loops, as already described above with regard to the third aspect.

According to a possible embodiment, the pannier is attached to the parachutist in a region in front of or below the parachutist's crotch. After release, the air bag preferably opens downwards and thus extends backwards between the parachutist's legs.

According to a possible embodiment of the present disclosure, the release element comprises a band element, which, in the packed state, surrounds the air bag inside the pannier and pushes the air bag out of the pannier when opened.

According to a possible embodiment, the release element comprises a securing element, which secures the pannier in the closed state. Preferably, when the pannier is in the packed state, the securing element passes through loops that are pushed through eyelets of the pannier and secure the pannier when closed. In particular, the securing element can be a wire element or a rod element made of plastic, in particular in the form of an elastic, for example bent rod. Preferably, the release element comprises both the securing element and the band element. The securing element secures the pannier in the closed state, wherein this securing is released by pulling on the securing element or removing the securing element from the pannier so that the air bag can be unpacked or unfolded.

According to a possible embodiment of the present disclosure, the air bag is arranged on a lower edge of the pannier, which is open at the bottom. It can therefore open downwards from the pannier.

Preferably, the inflow opening is located directly below the lower edge of the pannier in the air bag and can therefore be placed directly on a side wall of the pannier when the air bag is packed into the pannier. On the one hand, this ensures that no air can enter the inflow opening when the air bag is packed. On the other hand, the air bag with the correctly positioned inflow opening folds directly out of the pannier so that the inflow opening is in the airstream.

The spring element provided according to the first aspect is preferably stowed in the pannier in a tensioned state, in which the spring arms are folded against each other. In addition to the correct positioning of the inflow opening in the air flow, it also ensures that the air bag unfolds in the region between the pannier and the inflow opening.

According to a possible embodiment of the present disclosure, the pannier can be closed with a flap. Preferably, this flap comprises one or more eyelets, through which loops of the pannier are passed and secured via the securing element. The pannier is opened by pulling off the securing element.

According to a possible embodiment of the present disclosure, the inflow opening is reinforced with a support element in its edge region. In particular, the support element can be a plastic element. According to a possible embodiment, the support element is sewn into the air bag. The support element can surround the inflow opening around its entire circumference.

According to a possible embodiment of the present disclosure, the air bag has one or more outflow openings, which are preferably arranged in a rear and/or upper region of the air bag. During landing, these ensure that no excessive pressure builds up in the air bag that could tear it apart. Furthermore, during the landing approach, they ensure a safe filling of the air bag due to the slight air flow created through the air bag, and/or during landing an effective damping by a controlled release of air contained in the air bag.

According to a preferred embodiment, the one or more outflow openings are not closable. This ensures that the function of the outflow openings is not prevented by operating error during landing.

According to a preferred embodiment, the one or more non-closable openings are arranged on an upper and/or rear side of the air bag in order to exclude the possibility of being covered by the ground. In particular, the non-closable openings are positioned higher than the center of the rear side of the air bag.

In particular, the openings can be arranged in the region of an upper edge of the air bag, in particular in the region of a rear upper edge.

The non-closable openings can be formed by the fact that the textile elements of the air bag forming the rear side and the upper side are not connected to each other in the region of the openings.

An embodiment of a landing aid with one or more outflow openings of the air bag, which are not closable, is also a subject matter of the present disclosure independently of the embodiments according to the first to third aspects shown above.

In particular, the present disclosure according to a fourth aspect comprises a landing aid for parachutists, in particular for a tandem jump or landing with heavy equipment, having an air bag, which protects the parachutist during landing, wherein the air bag has an inflow opening through which air can flow into the air bag in order to fill it by means of the airstream. According to a fourth aspect, it is provided that the air bag has one or more outflow openings, which are not closable. Preferably, the one or more outflow openings are arranged in a rear region of the air bag.

Preferably, the one or more non-closable openings are designed as described above.

The fourth aspect is independent of the previously described aspects. However, this fourth aspect can also preferably be combined with one or more of the above-mentioned aspects.

In a possible embodiment of the present disclosure, the air bag according to the disclosure is designed so that it is only inflated by the airstream. In particular, the air flowing into the air bag through the inflow opening ensures that the air bag is inflated during the landing approach.

Preferably, the air bag is made from textile material. In particular, the air bag can be made of woven material.

The pannier is preferably made of a textile material, in particular a woven material.

The landing aid is preferably attached to the parachutist by means of strap elements.

The present disclosure further comprises the use of a landing aid, as described above, for protecting a parachutist during landing, in particular in a tandem jump or a landing with heavy equipment.

Preferably, the air bag is opened before the landing. Alternatively or additionally, the parachutist lands preferably sitting on the air bag. The air bag preferably protects the parachutist's buttocks and/or the lower back.

Preferably, the air bag is dimensioned such that two parachutists strapped together can both sit on the air bag during a tandem jump.

The present disclosure will now be described in more detail with reference to an exemplary embodiment and drawings.

DETAILED DESCRIPTION

Figure 1:
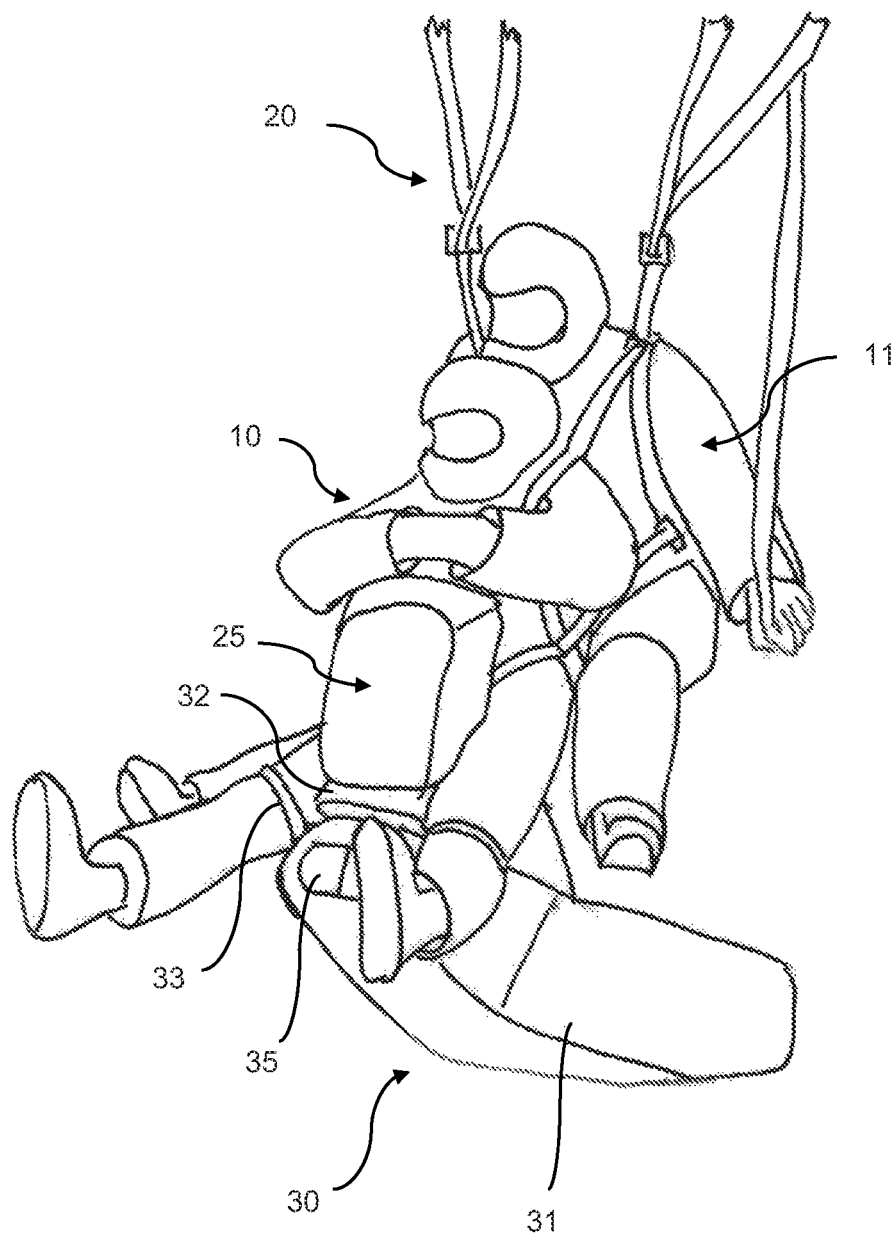
FIG. 1: shows the landing aid according to the disclosure in the inflated state during a landing approach.

FIG. 1 shows an exemplary embodiment of a landing aid according to the disclosure in use. In FIG. 1, the landing aid 30 is used for a tandem jump by the two parachutists 10 and 11, who are strapped together for this purpose via the harness 20. The landing aid 30 is attached to the front parachutist 10, i.e. in the case of a tandem jump, to the passenger flying in front.

The landing aid 30 comprises the air bag 31, on which both parachutists sit during landing This allows the air bag to protect the parachutists' buttocks and lower back during landing.

The air bag comprises an inflow opening 35 through which it is filled with air by means of the airstream. During freefall and the first part of the flight with the parachute open, the air bag 31 is initially stowed in a pannier 32. To prepare for landing, the landing aid is activated by unfolding the air bag 31 from the pannier 32. The inflow opening 35 places itself in the airstream and inflates the air bag.

As can be seen in FIG. 1, the landing aid is attached to the parachutist 10 in such a way that, in the inflated state, it extends backwards between the parachutist's legs. According to one aspect of the present disclosure, the landing aid 30 comprises leg straps 33 by means of which it is attached to the parachutist 10. The leg loops secure the position of the pannier 32 before activating the landing aid and the air bag 31 in the inflated state.

Figure 2:
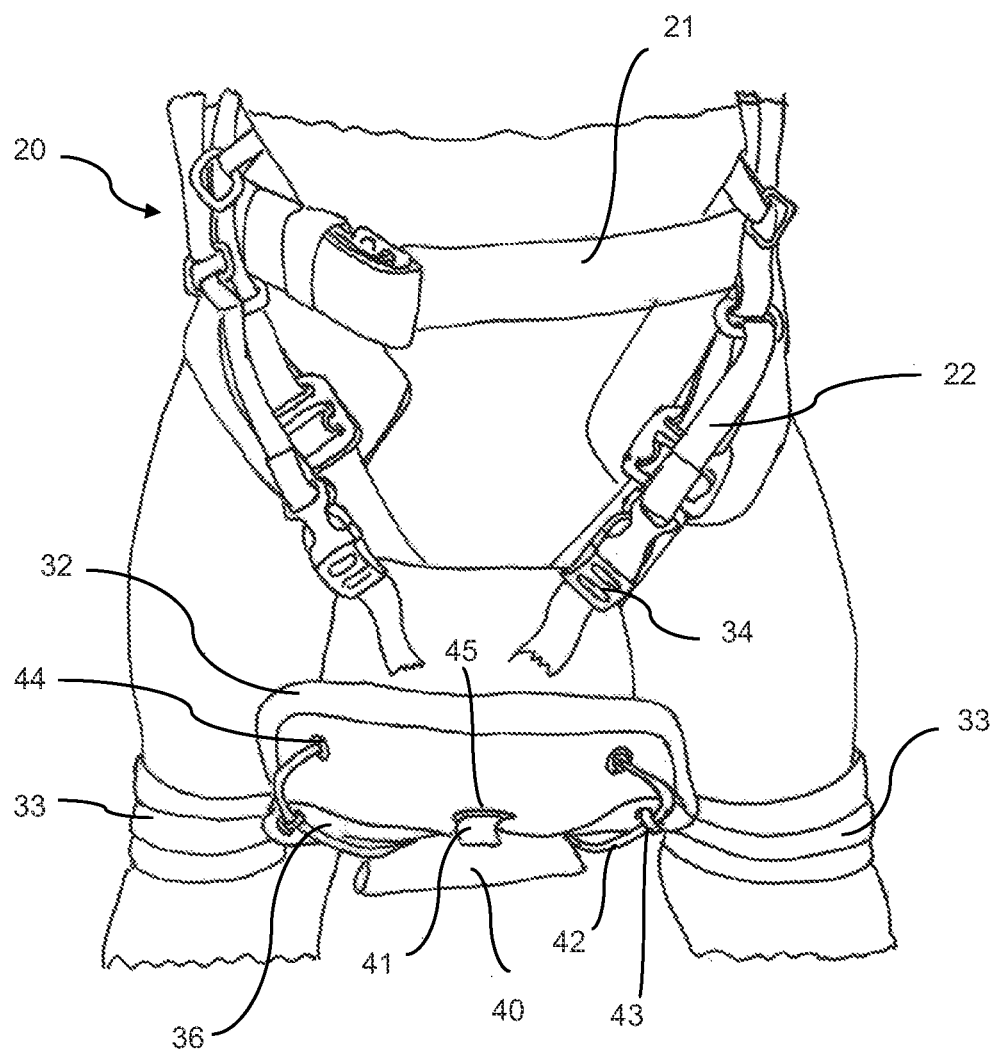
FIG. 2: shows the landing aid in the packed state, wherein the landing aid is attached to the parachutist.

The landing aid is attached to the parachutist 10 prior to activation in the region in front of or below the parachutist's crotch, and in particular connected to the parachutist's harness 20 as shown in FIG. 2.

This allows the parachutist 10 to carry a carrying bag 25 in front of their belly as an additional element independent of the landing aid. The landing aid also protects the parachutist's equipment, such as the carrying bag 25, during landing.

The landing aid 30 according to the disclosure can also be used for an individual jump.

FIG. 2 shows the landing aid 30 in the packed state. Here, the air bag 31 is packed into the pannier 32. In addition to the aforementioned leg loops 33, the landing aid further comprises strap elements and/or buckles 34 with which it can be connected to the parachutist's harness 20.

In particular, strap elements and/or buckles 34 are provided with which the pannier 32 can be connected at its upper edge to the strap elements 21 of the harness 20 via the straps 22. The landing aid is therefore attached to existing loops and eyelets of the parachutist's harness 20 in the hip area. The straps 22 are loops and part of the landing aid that loop into existing loops or rings of the harness 20.

The leg loops 33 are connected to the parachutist's legs above the knee. This connects the pannier to the parachute at four points.

The pannier 32 has an opening at its lower edge into which the air bag is folded into the pannier. In the packed state, this opening is closed by a flap 36. The flap is secured in the closed state by a securing element 42. This is a plastic bracket, which is pushed through loops 43. The loops 43 again pass through eyelets in the flap 36 so that the securing element 42 secures the flap 36 in its closed position.

The landing aid has a release element 40, to which the securing element 42 is attached. By pulling the release element, the bracket 42 is pulled out of the loops 43 and the pannier is opened. The free ends of the bracket 42 are inserted into eyelets 44 of the pannier in the packed state.

Furthermore, a strap element 41 is arranged on the release element 40, which supports the unpacking of the air bag from the bag. For this purpose, the strap element 41 runs around the packed air bag inside the pannier in the packed state. Pulling on the strap element pushes the air bag out of the pannier 32. For this purpose, the strap element 41 extends into the pannier 42 through a slot 45 at the free front edge of the pannier and is fastened with its inner end inside the pannier at its rear lower edge.

Pulling on the release element 40 therefore actuates the securing element 42 to release the securing of the pannier and also actuates the strap element 41, via which the air bag is pressed downwards out of the now open pannier.

Figure 3:
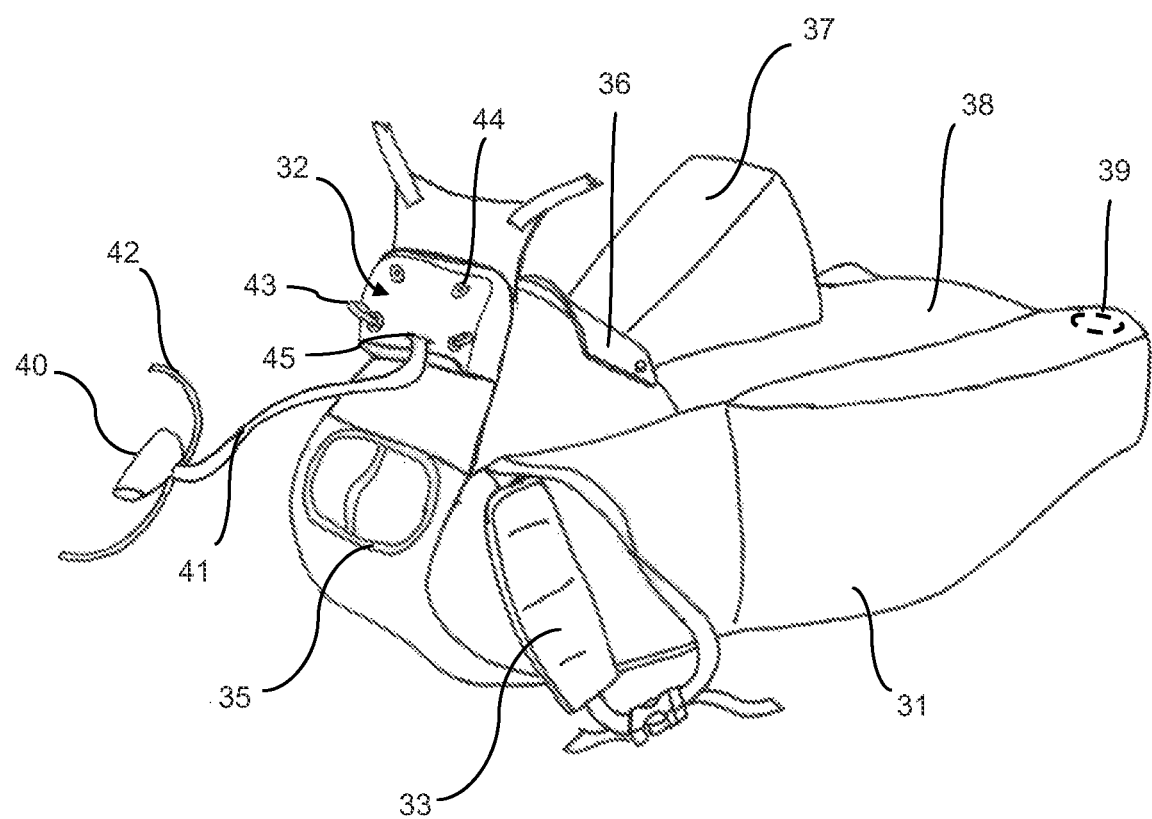
FIG. 3: shows the landing aid in the inflated state without the parachutist.

FIG. 3 shows the landing aid in the activated, inflated state. As can be seen in FIG. 3, the inflow opening 35 is arranged below the pannier, which is open at the bottom, on the air bag. In the packed state, the inflow opening 35 is packed directly onto the rear inner side of the pannier and the other fabric panels of the air bag are then packed into the remaining space of the pannier, for example in an accordion shape. When the landing aid is activated, the entire air bag folds out of the pannier, wherein the inflow opening 35 underneath the pannier is placed into the airstream, thereby filling the air bag 31.

FIG. 3 also shows the release element 40 with the securing element 42 and the strap element 41, the loops 43, which then pass through eyelets arranged on the flap 36, as well as the eyelets 44 for the ends of the securing element 42.

As can be seen in FIG. 3, the leg loops 33 are attached to the air bag 31, in particular to a region of the air bag that only acquires its shape due to the dynamic pressure inside the air bag. In particular, the leg loops 33 are arranged between two regions of the air bag 31 formed by textile panels. This secures the air bag in its inflated position to the carrier via the leg loops 33. The air bag is packed into the pannier 32 so that the leg loops protrude therefrom.

Alternatively, it would be conceivable to arrange the leg loops 33 directly on the pannier 32.

In the exemplary embodiment, the strap elements 34 for attaching the pannier 32 to the parachutist's harness 20 are arranged on another flap, which extends above and is connected to the pannier 32. However, they could also be attached directly to the pannier itself, in particular sewn thereto.

As can be seen in FIG. 3, the air bag 31 has a substantially elongated shape in the inflated state so that it can extend backwards between the parachutist's legs.

In the exemplary embodiment, the air bag 31 has a seat element 37 projecting upwards in a central region, on which the front parachutist 10 and behind which the second parachutist 11 sit. A lower, wider element of the air bag is provided for this purpose behind the seat element 37. However, the exact shape of the air bag can also be designed differently depending on the specific purpose.

Figure 4:
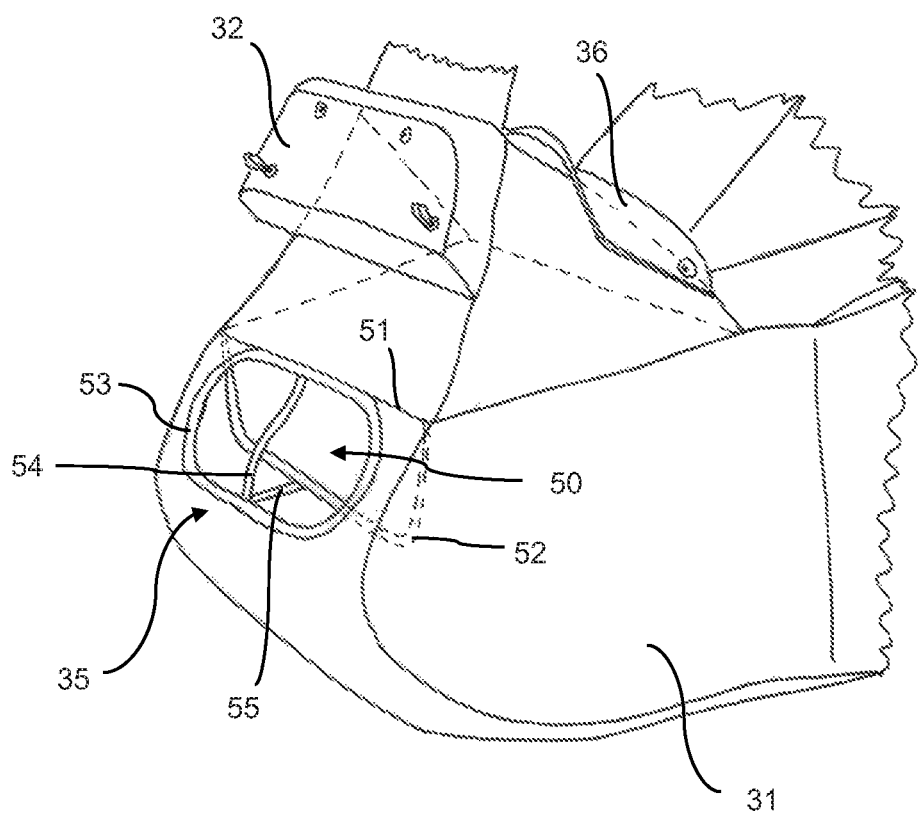
FIG. 4: shows a detailed view of the air bag in the inflated state with the inflow opening.

FIG. 4 shows the design of the non-return valve provided at the inflow opening 35 according to the second aspect. A flap valve element 50 in the form of a valve flap is provided, which is connected to the air bag 31 in the region 51 above the inflow opening in the manner of a hinge. The valve flap 50 closes the inflow opening 35 from the inside when there is a corresponding counterpressure inside the air bag by placing itself over the inflow opening 35 like a flap from the inside.

The valve flap 50 is made of a textile material, the flexibility of which also provides the hinge function. The valve flap 50 has a support element 52 that reinforces the edge region of the valve flap and is larger than the inflow opening 35. The support element can be sewn to or into the edge of the valve flap 35.

In the closed state, the valve flap 50 rests on the region of the air bag 31 surrounding the inflow opening 35, wherein in particular the region reinforced by the support element 52 rests on the air bag when the valve is closed.

The inflow opening 35 preferably also has a reinforced edge region 53. In particular, a support element is also provided here, which is sewn to the edge region 53 of the inflow opening 35 or sewn into this edge region.

The support elements 52 and 53 are preferably made of plastic. In particular, these are plastic rings. The support elements could be cut out of a plastic plate.

A band element 54 runs across the inflow opening 35, in particular from an upper edge to a lower edge of the inflow opening 35. The band element 54 prevents the valve flap 50 from being pressed outward from the inside through the inflow opening 35.

Furthermore, the free lower edge of the valve flap 50 is secured in a maximum open position via a band element 55. One end of the band element 55 is connected to the lower edge of the valve flap 52 and the other end is connected to the lower edge of the inflow opening 35. The strap element 55 prevents the valve flap from being opened too much by the inflowing air and from resting against the top of the air bag 31. In particular, the valve flap 52 is secured in a maximum open position via the strap element 55, which ensures that the flap valve is securely closed in the event of a corresponding counterpressure within the air bag 31.

Figure 5:
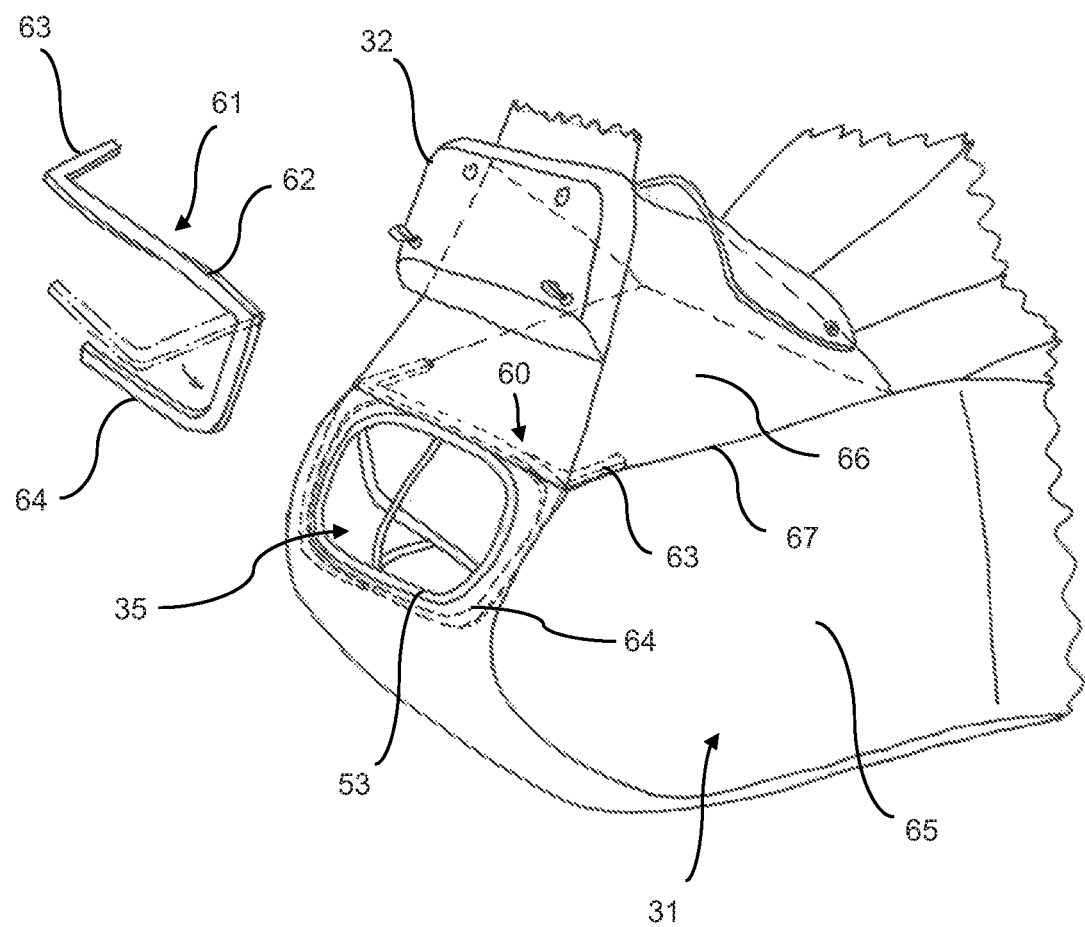
FIG. 5: shows a further detailed view of the region of the inflow opening with the spring element according to the disclosure.

FIG. 5 shows the use of a spring element 60 according to the first aspect of the present disclosure. In the exemplary embodiment, the spring element 60 initially positions the inflow opening 35 in the airstream and generates a counterpressure that prevents the inflow opening from being pressed by the airstream into an unfavorable position in which it no longer receives appropriate air flow. Furthermore, the spring element has the function to support the unfolding of the air bag from its packed position when the landing aid is activated. In alternative embodiment, the spring element could also only have one of the two functions.

In the exemplary embodiment, the spring element 60 comprises two torsion springs 61. These extend around the inflow opening 35 with a first spring arm 64 on opposite sides of the inflow opening. A second spring arm 63, on the other hand, is supported on the air bag 65. The torsion spring region 62 extends between the first and second spring arms, which region, for both torsion springs 61 runs along the upper edge of the inflow opening 35 from one side of the inflow opening to the opposite side.

The torsion springs 61 are sewn to the air bag and in particular sewn into it.

The second spring arm 63 is supported in each case on regions of the air bag 31 that only obtain their shape through the dynamic pressure within the air bag, and is arranged in particular between textile panels 65 and 66 of the air bag. In the exemplary embodiment, the second spring arm is connected to a respective seam region 67 between the textile elements 66 and 65 of the air bag and in particular is sewn thereto along the seam 67. Here, the textile element 66 connects the textile element 65 to the pannier 32.

After folding the inflow opening 35 into the pannier 32, in which the lower edge of the inflow opening 35 is first pushed into the interior of the pannier, the second arms 63 of the spring element 60 initially protrude from the pannier. They are now pressed onto the first arms 64 by folding the material of the air bag onto each other and the spring is thereby folded into the pannier 32 in a tensioned state.

After opening the pannier 32 and pushing the air bag out of the pannier 32 by means of the release element, the spring element 60 ensures that the air bag immediately unfolds to the rear. Furthermore, after opening, the spring element ensures that a counterpressure is applied to the inflow opening 35, which prevents the inflow opening from folding away towards the rear.

In the exemplary embodiment, the torsion springs 61 are made of plastic. They are cut out of a flat plastic plate and have essentially the shape of a Z in the untensioned state, which is shown in dashed lines on the left in FIG. 5. In the tensioned state, on the other hand, the first bracket 64 surrounding the inflow opening 35 is pressed downwards, as shown by the arrow in FIG. 5.

In the exemplary embodiment, the first bracket 64 surrounds the inflow opening not only along the transverse sides, but also along its lower edge approximately up to the center. The two torsion springs 61 therefore surround the inflow opening 35 essentially completely via their respective first brackets 64 and the torsion region 62. They are preferably dimensioned so that they surround the reinforced edge region 53 of the inflow opening 35.

As can further be seen in FIG. 3, the air bag 31 comprises outflow openings 39, which, in the exemplary embodiment, are arranged in a rear, upper region of the air bag. These prevent bursting of the air bag 31 and controlled damping on landing by allowing a certain amount of air to escape.

In the exemplary embodiment, the outflow openings 39 are designed so that they cannot be closed. This prevents operating errors. The cross-sectional area of the outflow openings 39 is such that the air bag 31 fills safely and has the desired damping effect on landing without the air bag 31 bursting.

The outflow openings are located in the region of the top edge or a top side of the air bag so that they cannot be closed during landing even by contact with the ground.

Figure 6:
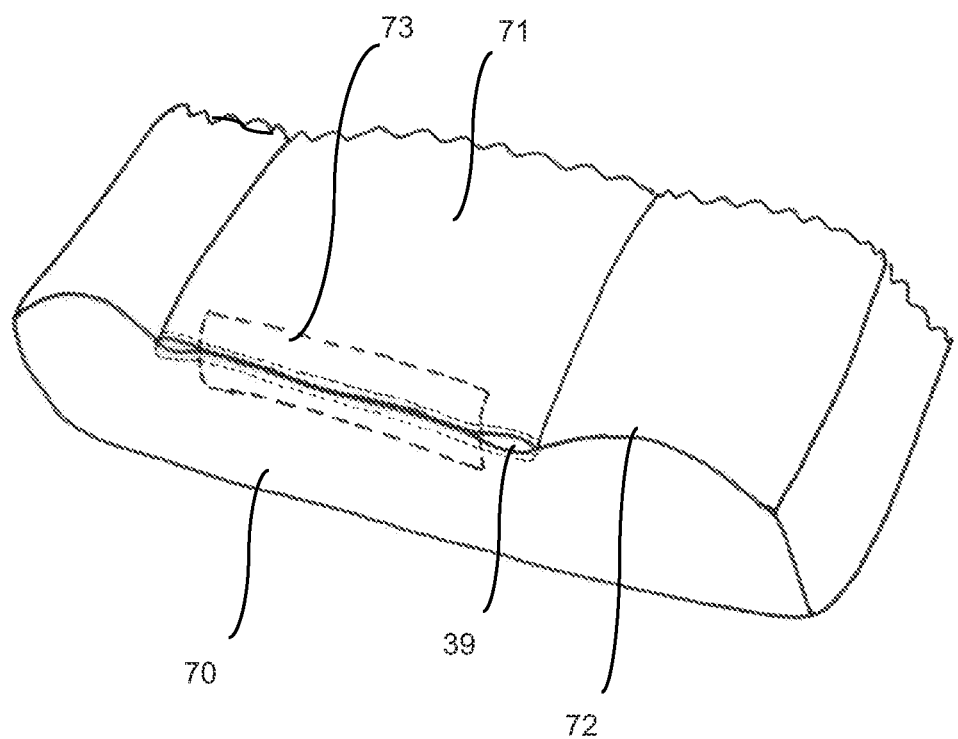
FIG. 6: shows a detailed view of the rear region of the air bag with the outflow openings.

FIG. 6 shows the design of the outflow openings 39 used in the exemplary embodiment. The outflow openings 39 are provided here in the region of the upper edge 72 between a rear side 70 and an upper side 71 of the air bag and in particular between the corresponding textile elements forming the rear side 70 and an upper side 71 of the air bag. In the exemplary embodiment, the corresponding textile elements in the region of the outflow openings 39 are not connected to each other. In particular, the joining edges of the textile elements in the region of the outflow openings 39 are not joined or sewn. This is realized in the exemplary embodiment by the fact that a connecting element 73, which connects the two textile elements in the region between the outflow openings 39 by being sewn to both textile elements, is not provided in the region of the outflow openings.

The joining edges of the textile elements do not overlap in the region of the outflow openings 39 in order to avoid an unintentional closing of the outflow openings 39 by placing the textile layers on top of each other.

In the exemplary embodiment, the air bag 31 and the pannier 32 are each made of a textile material, in particular a woven fabric. Except for the above-mentioned reinforcing elements made of plastic, the air bag is preferably made exclusively of textile material.

The underside of the air bag, which comes to rest on the ground during landing, is preferably made of a more stable material than the remaining regions of the air bag.

The individual aspects of the present disclosure enable, firstly, a high level of safety in the use of the landing aid. They also enable a particularly light and space-saving design of the landing aid.

The invention claimed is:

1. Landing aid for a parachutist,
comprising an air bag, which protects the parachutist during landing,
wherein the air bag has an inflow opening through which air can flow into the air bag in order to fill it by means of the airstream,
wherein
the landing aid comprises a spring element, by means of which the inflow opening is held in the correct position with respect to the air flow, wherein the spring element comprises one or more second support regions with which it applies a counterforce to the inflow opening acting against the pressure of the airstream.

2. Landing aid according to claim 1, wherein the spring element is integrated in the air bag and sewed into it.

3. Landing aid according to claim 1, wherein the spring element comprises one or more first support regions with which it is supported on a region of the air bag held in shape by the dynamic pressure inside the air bag.

4. Landing aid according to claim 1, wherein the spring element is a torsion spring element and/or wherein the spring element is made of plastic.

5. Landing aid according to claim 4, wherein the spring element comprises two torsion springs, the torsion axis of which extends along one upper edge of the inflow opening in each case, wherein the torsion springs each have a first arm, which extends along one of the two side edges of the inflow opening and a second arm, which is supported above the inflow opening on a region of the air bag.

6. Landing aid according to claim 4, wherein the spring element comprises one or more torsion springs cut out of a plastic plate in the form of Z-shaped torsion springs cut out of a plastic plate.

7. Landing aid according to claim 1, wherein the spring element is configured for supporting an unpacking process of the air bag.

8. Landing aid according to claim 1, wherein the spring element further comprises one or more first support regions supported on a first region of the landing aid, the one or more second support regions of the spring element at least partly surrounding the inflow opening in a second region of the landing aid different from the first region, the spring element generating a spring force between the one or more first support regions and the one or more second support regions.

9. Landing aid for a parachutist,
comprising an air bag, which protects the parachutist during landing,
wherein the air bag has an inflow opening with a non-return valve through which air can flow into the air bag in order to fill it by means of the airstream,
wherein
the non-return valve has a flap valve element arranged inside the air bag, which is hinged to the air bag on one side and closes the inflow opening in the form of a flap when there is a corresponding pressure in the air bag.

10. Landing aid according to claim 9, wherein the flap valve element is formed by a textile element.

11. Landing aid according to claim 10, wherein the textile element is reinforced with a support element in a region surrounding the inflow opening, wherein the support element is preferably made of plastic and/or sewn in.

12. Landing aid according to claim 9, wherein a band element extends across the inflow opening, which prevents the flap valve element from being pressed out through the inflow opening.

13. Landing aid according to claim 9, wherein the free end of the flap valve element is secured by a band element, which prevents complete opening of the flap valve element.

14. Landing aid for a parachutist,
comprising an air bag, which protects the parachutist during landing,
wherein the air bag has an inflow opening through which air can flow into the air bag in order to fill it by means of the airstream,
the landing aid further comprising a pannier firmly attached to the air bag, in which the air bag can be stowed, wherein the pannier comprises a release element for opening the pannier in flight and activating the air bag,
wherein
the landing aid comprises leg loops with which it can be attached to the legs of the parachutist in such a way that the pannier is attached in a region in front of or below the parachutist's crotch and the air bag extends backwards between the legs of the parachutist after opening.

15. Landing aid according to claim 14, wherein strap elements are arranged on the pannier for connection to leg loops and/or a harness of the paraglider.

16. Landing aid according to claim 14, wherein the release element comprises a band element, which, in the packed state, surrounds the air bag inside the pannier and presses it out of the pannier when it is opened, and/or wherein the release element comprises a securing element, which secures the pannier in the closed state, wherein the securing element, in the packed state, passes through loops that are pushed through eyelets of the pannier and secure the pannier in the closed state, and/or wherein the air bag is arranged on the lower edge of the pannier, which is open at the bottom, and/or the pannier can be closed by a flap.

17. Landing aid according to claim 14, wherein the inflow opening is reinforced in its edge region with a support element, wherein the support element is made of plastic and/or sewn in.

18. Landing aid according to claim 14, wherein the air bag has one or more outflow openings, wherein the one or more outflow openings are not closable.

19. Landing aid according to claim 14, the landing aid configured for a tandem jump or landing with heavy equipment.

20. Landing aid according to claim 14, wherein the leg loops are attached to the air bag and/or attached to the pannier and/or connected to each other by a strap element.

21. Landing aid according to claim 14, wherein the one or more outflow openings are arranged in a rear and/or upper region of the air bag.

* * * * *